June 9, 1964 W. ZEIDLER 3,136,142
SHAFT, MORE PARTICULARLY UNIVERSAL JOINT
SHAFT, WITH TORSIONAL FLEXIBILITY
Filed March 2, 1962 2 Sheets-Sheet 1
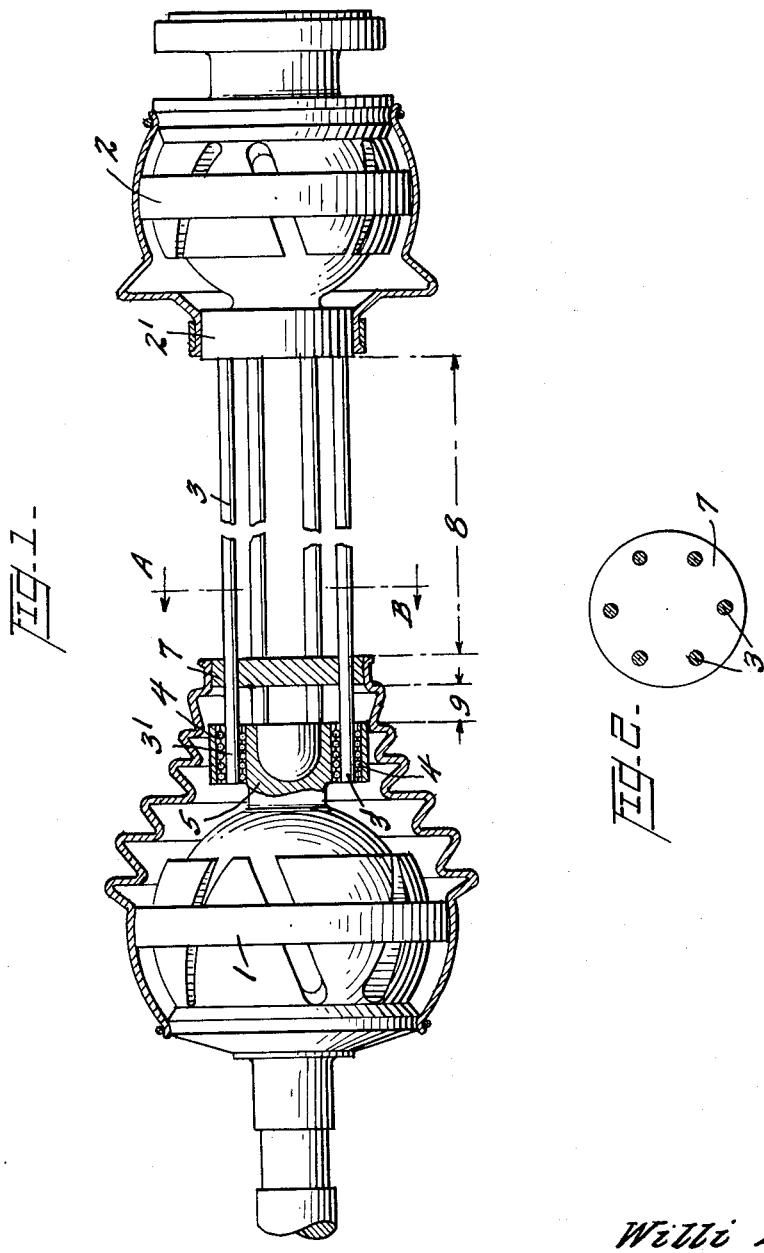
INVENTOR
Willi Zeidler,
BY
Watson, Cole, Grindle & Watson
ATTORNEYS June 9, 1964 W. ZEIDLER 3,136,142
SHAFT, MORE PARTICULARLY UNIVERSAL JOINT
SHAFT, WITH TORSIONAL FLEXIBILITY
Filed March 2, 1962 2 Sheets-Sheet 2
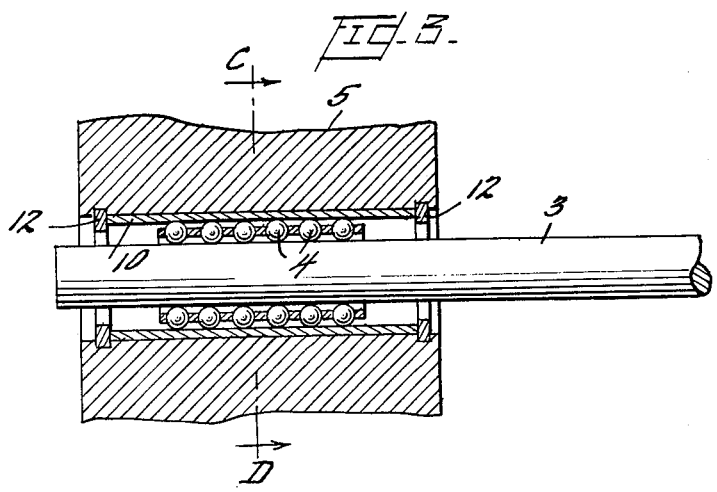
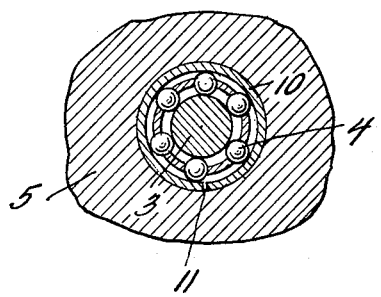
INVENTOR
Willi Zeidler,
BY
Watson, Cole, Grindle & Watson
ATTORNEYS

United States Patent Office 3,136,142
Patented June 9, 1964

3,136,142
SHAFT, MORE PARTICULARLY UNIVERSAL JOINT SHAFT, WITH TORSIONAL FLEXIBILITY
Willi Zeidler, Dusseldorf, Germany, assignor to Firma Rheinmetall G.m.b.H., Dusseldorf, Germany
Filed Mar. 2, 1962, Ser. No. 176,954
Claims priority, application Germany Jan. 26, 1962
1 Claim. (Cl. 64—15)

This invention relates to a shaft, more particularly a universal joint shaft, with torsional flexibility and capable of adjustment of length, consisting of at least two parts capable of relative axial movement.

The main drawback of known designs of such elements is the high cost of manufacture and maintenance. These drawbacks are particularly marked in the case of split shafts which are paired by splines and in this manner rendered capable of relative axial movement. The high accuracy required in manufacture and the comparatively high rate of wear in use make their employment uneconomical, particularly since both parts have to be replaced whenever one is worn. In these embodiments the relative axial movement takes place under a load which offers considerable resistance to such movement. The large normal forces which are exerted between the surfaces of the splines in contact during such movement require the application of comparatively large axial thrusts to bring such movement about. In order to provide torsional flexibility, additional parts possessing elastic flexibility, made e.g. of rubber, are incorporated in the design thereby still further increasing the cost of such shafting.

It is an object of the present invention to overcome the disadvantages very broadly stated above of the known shafts, more particularly universal joint shafts, with torsional flexibility and capable of adjustment in length. The main advantageous feature distinguishing the invention from such known shafts is the fact that it comprises a number of flexible torsional bars arranged parallel to the axis of the shaft, which join two parts of the shaft in such a manner as to render them capable of relative longitudinal movement and of which at least one end is so supported in the relevant part of the shaft as to be capable of relative axial movement.

In a preferred embodiment of the invention, the flexible torsion bars constitute the actual transmission shaft; one of their ends is rigidly connected to one end or flange respectively of the neighbouring shaft whilst the other end is joined to the end or flange respectively of the other neighbouring shaft in such a manner as to be capable of relative axial movement.

When the shafting transmits power, the torsion bars will twist by a greater or lesser amount; as the load is taken off, they return again to their original relative position. Since the bars are so supported at least at one end as to be capable of axial movement, they possess not only torsional flexibility but also the ability to adjust their effective length.

Further details of the invention are given by the following description of the embodiment represented on the accompanying drawing in which—

FIG. 1 is a side view of a universal joint shaft having two universal joints,

FIG. 2 is a section through the shaft shown on FIG. 1, viewed in the direction A—B, FIG. 3 is a longitudinal section through a support for one movable end of a flexible torsion bar, shown to an enlarged scale, and FIG. 4 is a cross section through the support of FIG. 3, viewed in the direction C—D.

Referring to the embodiment shown on the drawing, the universal joint shaft consists of two shaft ends of which one is the driving joint 1 and the other is the driven joint 2, both the shaft joints 1 and 2 being connected by the transmission shaft which according to the invention comprises a number of—six, in the example as here illustrated—flexible torsion bars 3 arranged parallel to the longitudinal axis of the shaft. The flexible torsion bars 3 are mounted rigidly in the flange 2' of the driven joint 2; their ends 3' are so supported by means of ball bearings 4 in the flange 5 of the driving joint 1 as to be capable of axial movement. The flexible torsion bars carry a disc 7 located at some distance from the flange 5; the effect of this is that the flexible torsion bars 3 can twist only over the length of the distance 8 whereas the distance 9 remains largely untwisted. This prevents the flexible torsion bars from twisting within the length 9 thereby facilitating the axial movement of the ends of these bars in the ball bearings 4 and hence protecting the latter against undue wear.

In addition the ball bearings 4 can be set in a rubber bush (not shown on the drawing). This is an advangtage particularly if universal joints are not used, since in that case the flexible mounting of the ball bearings 4 permits a small amount of misalignment of the shafts.

In some cases the ball bearings 4 can be dispensed with altogether, particularly if a longitudinal adjustment of the shaft length is not required.

Within the frame of the invention the flexible torsion bars 3 may be of any cross sectional profile. They are with advantage enclosed in a tubular housing (not shown on the drawing) in order to protect them against dust. The flexible torsion bars 3 need not be enclosed in a housing over the whole of their length. It is sufficient if only the end which is capable of axial movement and the neighbouring component are protected against the outside—as shown on the left-hand part of the drawing FIG. 1—by a housing which may be bellows-shaped or corrugated respectively, one of whose ends being attached to the periphery of the disc 7 whilst the other end is attached to the flange 5.

In order to prolong the life of the ball bearings 4 as far as possible, they are supported in a spring bush 10 which is with advantage rolled of spring steel and which is open along the longitudinal edge separation 11 as shown on FIG. 4. At the ends the bush 10 is retained axially inside the flange 5 by means of circlips 12 and 12'. The springs 10 are rolled with radial pre-tension so that they always tend to close upon the ball bearings 4. In this manner play due to normal wear is eliminated so that the ball bearings 4 will always sit firmly inside the bushes 10.

In further development of the invention, special tracks or grooves can be cut into the ends of the flexible torsion bars 3 which are capable of axial movement, and/or into the bushes, to provide guides for the balls.

The invention is not restricted to the embodiment herein illustrated and described. Thus, only the centre portion of a shaft may consist of flexible torsion bars whilst the remaining part is in the form of stub shafts, in which case one end of the flexible torsion bars is rigidly joined to one of the stub shafts whilst the other end is so joined to the other stub shaft as to be capable of axial movement.

The shaft need not be provided with universal joints. Its ends may be connected rigidly with one of the neighbouring shafts, e.g. the driving one, and so connected to the driven shaft as to be capable of axial movement. The flexible torsion bars may also be so joined to the neighbouring shafts that both their ends are capable of axial movement. The number of flexible torsion bars to be used depends on the power to be transmitted.

What I claim is:

A shaft, more particularly a universal joint shaft, with torsional flexibility and capable of adjustment as to length, comprising at least two parts capable of relative axial movement, flexible torsion bars arranged parallel to the axis of the shaft joining the two parts of the shaft to render them capable of relative longitudinal movement and of which at least one end is so supported in the adjacent part of the shaft to be capable of relative axial movement, the flexible torsion bars constituting the transmission shaft with one of their ends being rigidly connected to one end of the adjacent shaft while the other end is joined to the end of the other adjacent shaft, a ball bearing in the said other adjacent shaft for each bar to be capable of axial movement, and a spring bush located with a resilient radial movement outside the bearing thereby exerting a resilient force on the balls of each ball bearing, the spring bush being in the form of a sheet rolled with pre-tension and open along a longitudinal edge separation.

References Cited in the file of this patent

UNITED STATES PATENTS

| | | |
|---|---|---|
| 1,939,653 | Bijur | Dec. 19, 1933 |
| 2,311,815 | Briney | Feb. 23, 1943 |
| 2,558,158 | Rock | June 26, 1951 |
| 2,696,719 | Sklar | Dec. 14, 1954 |
| 3,019,622 | Fermier | Feb. 6, 1962 |
| 3,038,323 | Wallman | June 12, 1962 |

FOREIGN PATENTS

| | | |
|---|---|---|
| 885,792 | Germany | Aug. 6, 1949 |
| 903,642 | Germany | Feb. 8, 1952 |